Dec. 4, 1928.　　　　　　　　　　　　　　　　　1,694,174
R. C. GREENWOOD
SNOWPLOW
Filed July 16, 1926　　　2 Sheets-Sheet 2
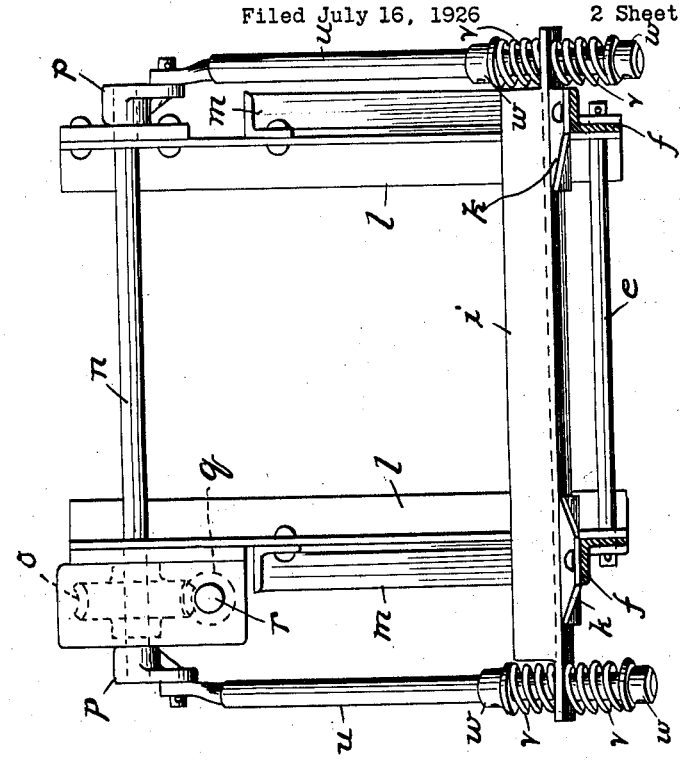
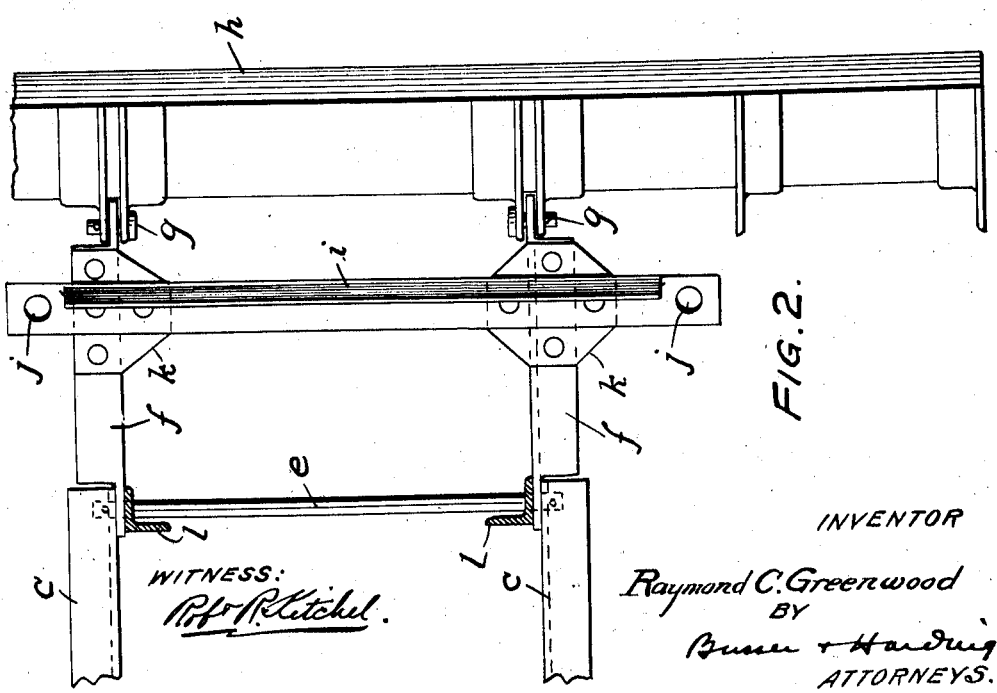
INVENTOR
Raymond C. Greenwood
BY
ATTORNEYS.
WITNESS:

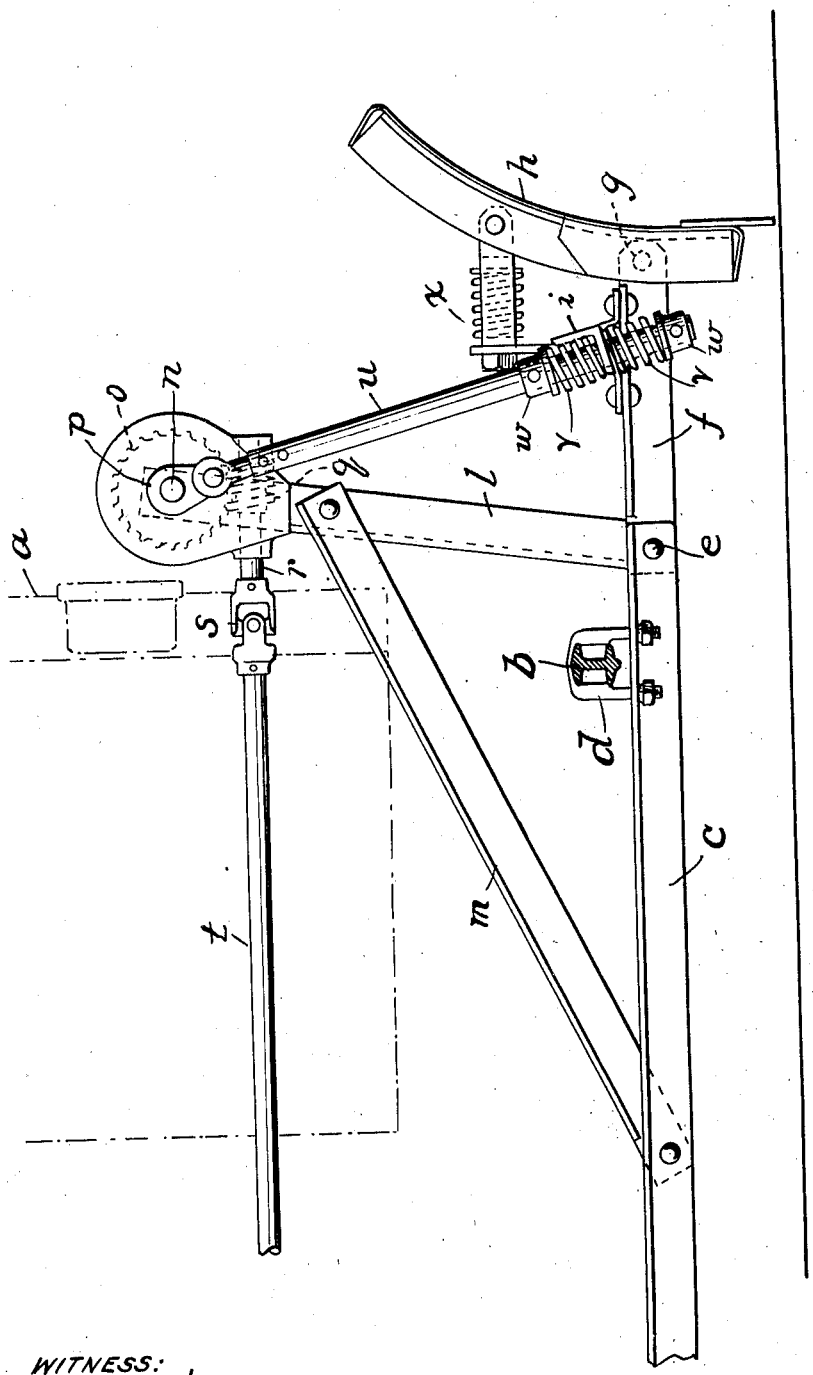

Patented Dec. 4, 1928.

1,694,174

UNITED STATES PATENT OFFICE.

RAYMOND C. GREENWOOD, OF KENNETT SQUARE, PENNSYLVANIA, ASSIGNOR TO AMERICAN ROAD MACHINERY COMPANY, INC., OF KENNETT SQUARE, PENNSYLVANIA, A CORPORATION OF DELAWARE.

SNOWPLOW.

Application filed July 16, 1926. Serial No. 122,839.

My invention relates to snow plows and more particularly to snow plows of the type adapted to be secured in front of a motor truck or tractor for use in cleaning snow from streets and highways.

Plows of the character to which my invention pertains, and particularly the blade type, have proved of great value, in connection with the removal of snow from city streets and in maintaining highways open, the chief advantage of such plows being their adaptability to a convenient and otherwise useful source of power, as a tractor or truck, and because of the relatively high speed at which they may be operated with efficiency.

Such plows, while, as indicated, of great advantage, are, especially when built in the smaller sizes, open to certain objections among which may be mentioned that the plow has a tendency to bounce off the ground, its weight being insufficient to hold it down, thus materially reducing its efficiency.

Now it is the object of my invention to provide a plow of the character indicated, but which will be so constructed as to practically eliminate the tendency to bounce and insure the plow remaining on the ground, irrespective of the weight of the plow. Thus, by virtue of my invention, a comparatively small, light plow may be produced which will operate with a high degree of efficiency superior to that of the present larger plows and a large plow of increased efficiency may be produced.

Having now indicated, in a general way, the nature and purpose of my invention, I will proceed to a detailed description thereof with reference to the accompanying drawings in which there is illustrated a preferred embodiment of my invention, and in which:

Fig. 1, is a side elevation of a snow plow embodying my invention, shown in association with a tractor diagrammatically illustrated.

Fig. 2, is a plan view of portions of the plow shown in Figure 1.

Fig. 3, is a front view of the subject of Figure 1 partly in section.

In the drawings, $a$ indicates diagrammatically the forward portion of a tractor having a front axle $b$. Longitudinally on opposite sides of the tractor are positioned side frame members $c$ of a main frame which are secured to the front axle of the tractor by means of clips $d$. The frame members $c$ are connected at the rear of the tractor by a transverse member secured in a suitable way to the tractor draw bar.

Pivotally secured to the forward ends of frame members $c$ by means of a pin $e$, are the rear ends of a pair of side members $f$ of an auxiliary frame, to the forward ends of which is pivotally secured by means of pins $g$, a plow blade $h$. The plow blade $h$ is maintained in working position, and at the same time is permitted to tilt so as to pass over obstructions by means of a tension device $x$, such for example as is shown and described in the patent to Ruth 1,195,271 dated August 22, 1916.

A cross piece $i$ connects the two frame members $f$, its ends extending beyond the members $f$ and being provided with holes $j$. The cross piece $i$ is secured to the members $f$ by means of gusset plates $k$ which are so formed as to tilt the piece $i$ backwardly, as shown in Figure 3.

A pair of upright supports $l$ carried on pivot pin $e$ extend upwardly from the forward ends of frame strut members $c$ and are braced by members $m$ secured to members $c$.

The supports $l$ serve to carry a shaft $n$, which carries a worm wheel $o$ and upon opposite ends of which are secured cranks $p$.

A worm $q$, on the end of a shaft $r$, is suitably supported in operative relation with the worm wheel $o$, shaft $r$ being connected through a universal joint $s$ with a shaft $t$, which may be provided with a hand wheel or suitably connected to mechanism for driving it from the tractor power plant.

To the cranks $p$ are connected the ends of rigid rods $u$, the other ends of which extend through the holes $j$ in cross piece $i$. Springs $v$ are positioned on rods $u$ above and below cross piece $i$ and bear thereagainst, being retained under tension respectively by means of stops $w$, adjustably secured to the rods $u$.

In the operation of the plow, it will be obvious that the blade is propelled by the tractor, or any other suitable source of power as a motor truck and the blade is held from swinging or in working position by the tension device $x$ and at the same time is permitted to swing or tilt on its working edge meeting an obstruction.

As will be noted, the frame members $f$ to which the blade is pivoted are pivoted to the members c secured to the tractor, the members f and the blade may then be lifted or lowered about the first pin e and for this purpose the shaft n, rotatable by means of the worm q and worm wheel o and connected to the cross piece i through cranks p, rods u and springs v, is provided.

When the shaft n is rotated, the members f and the plow will be raised and lowered and the springs v on rods u beneath the cross piece i will act as resilient connections between the rods u and members f. When the plow is in operative position, the springs v above the cross piece i will act against the rigid rods u to yieldingly prevent the plow from bouncing and finally on being compressed to a maximum act as a stop against upward movement of the plow.

It will be understood that where in the claims hereto appended I refer to a tractor, I mean to include a motor truck or other suitable source of power.

Having now fully described my invention, what I claim and desire to protect by Letters Patent is:—

1. A main frame for a snow plow comprising two side members, means for connecting the side members to a tractor, an auxiliary frame having two side members pivotally connected at their rear ends to the side members of the main frame, a gusset plate connected to each of the side members of the auxiliary frame, a cross-bar connected to the gusset plates and extending beyond the side bars of the auxiliary frame, said cross-bars having openings therethrough adjacent their ends, means for pivotally connecting a snow plow to the other ends of the side bars of the auxiliary frame, auxiliary frame supporting rods extending through the cross-bars, and means on the main frame for raising and lowering the supporting rods.

2. A supporting frame for supporting a snow plow from a tractor comprising a main frame arranged to be connected to the tractor, said main frame having two side bars, an upright bar connected to each side bar, a rigid strut connecting the upper end of each upright to its side bar, an auxiliary frame having two side bars formed of angle iron having vertical and horizontal webs, the horizontal webs being cut away adjacent the ends of the bars, there being openings through each end of each of the side bars of the auxiliary frame, means for pivotally connecting the rear ends of the side bars of the auxiliary frame to the side bars of the main frame through two of said openings, a snow plow pivotally connected to the openings in the other ends of the side bars of the auxiliary frame, a gusset plate connected to the horizontal flange of each of the side bars of the auxiliary frame, an angle bar connected to the gusset plates and extending beyond the side bars of the auxiliary frame, hoisting mechanism supported by the upright on the main frame, and actuating rods connected to the hoisting mechanism end extending through openings in the ends of the angle bar connected to the gusset plates.

In testimony of which invention, I have hereunto set my hand, at Kennett Square, Pennsylvania, on this 1st day of July, 1926.

RAYMOND C. GREENWOOD.